US012641461B2

(12) United States Patent (10) Patent No.: US 12,641,461 B2
Yerramalli et al. (45) Date of Patent: May 26, 2026

(54) SHARING MEASUREMENT GAPS FOR MULTIPLE FUNCTIONS

(71) Applicant: QUALCOMM Incorporated, San Diego, CA (US)

(72) Inventors: Srinivas Yerramalli, San Diego, CA (US); Mukesh Kumar, Hyderabad (IN); Alexandros Manolakos, Escondido, CA (US); Arash Mirbagheri, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 17/999,599

(22) PCT Filed: Jul. 22, 2021

(86) PCT No.: PCT/US2021/070925
§ 371 (c)(1),
(2) Date: Nov. 22, 2022

(87) PCT Pub. No.: WO2022/020851
PCT Pub. Date: Jan. 27, 2022

(65) Prior Publication Data
US 2023/0224745 A1 Jul. 13, 2023

(30) Foreign Application Priority Data
Jul. 23, 2020 (GR) .............................. 20200100433

(51) Int. Cl.
*H04W 24/10* (2009.01)
*H04L 5/00* (2006.01)
*H04W 36/00* (2009.01)

(52) U.S. Cl.
CPC ........... *H04W 24/10* (2013.01); *H04L 5/0057* (2013.01); *H04W 36/0088* (2013.01)

(58) Field of Classification Search
CPC .. H04W 24/10; H04W 36/0088; H04L 5/0057
See application file for complete search history.

(56) References Cited

U.S. PATENT DOCUMENTS

2011/0199908 A1* 8/2011 Dalsgaard ............. H04W 24/10
370/329
2012/0264449 A1* 10/2012 Kazmi .................... G01S 5/011
455/456.1
(Continued)

FOREIGN PATENT DOCUMENTS

CN 111247852 A 6/2020
CN 111466129 A 7/2020
(Continued)

OTHER PUBLICATIONS

CMCC: "TP on Introducing Inter-Frequency Measurements without Measurement Gap", 3GPP Draft, R4-2003518, 3GPP TSG-RAN WG4 Meeting #94-e-Bis, 3rd Generation Partnership Project (3GPP), Mobile Competence Centre, 650, Route Des Lucioles, F-06921 Sophia-Antipolis Cedex, France, vol. RAN WG4. No. Online Meeting, Apr. 20, 2020-Apr. 30, 2020, Apr. 10, 2020 (Apr. 10, 2020), XP051872114, 19 Pages, p. 2, paragraph 9.1.2.1—p. 6, paragraph 9 .1.5.
(Continued)

*Primary Examiner* — Kevin T Bates
*Assistant Examiner* — Hector Reyes
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive configuration information that configures a measurement gap for the UE. The UE may perform a first
(Continued)

measurement and a second measurement in the measurement gap, wherein the first measurement and the second measurement are different types of measurements. The UE may transmit measurement information based at least in part on the first measurement or the second measurement. Numerous other aspects are provided.

30 Claims, 7 Drawing Sheets

(56) References Cited

U.S. PATENT DOCUMENTS

| | | | | |
|---|---|---|---|---|
| 2013/0303199 | A1* | 11/2013 | Siomina | H04W 24/10 |
| | | | | 455/456.5 |
| 2017/0156074 | A1* | 6/2017 | Choi | H04W 24/10 |
| 2018/0076872 | A1* | 3/2018 | Li | H04B 7/0417 |
| 2018/0368034 | A1 | 12/2018 | Lin et al. | |
| 2019/0075585 | A1* | 3/2019 | Deogun | H04B 7/02 |
| 2019/0124533 | A1 | 4/2019 | Tenny et al. | |
| 2019/0150015 | A1* | 5/2019 | Wei | H04L 27/2666 |
| | | | | 370/328 |
| 2019/0306734 | A1* | 10/2019 | Huang | H04W 24/08 |
| 2019/0342801 | A1* | 11/2019 | Cui | H04W 72/23 |
| 2020/0137601 | A1* | 4/2020 | Siomina | H04W 4/70 |
| 2021/0058891 | A1* | 2/2021 | Huang | H04W 64/00 |
| 2021/0120513 | A1* | 4/2021 | Siomina | H04W 64/00 |
| 2023/0038050 | A1* | 2/2023 | Si | H04W 36/0088 |

FOREIGN PATENT DOCUMENTS

| | | | |
|---|---|---|---|
| WO | 2019033058 | A1 | 2/2019 |
| WO | 2019036841 | A1 | 2/2019 |

OTHER PUBLICATIONS

International Search Report and Written Opinion—PCT/US2021/070925—ISA/EPO—Oct. 29, 2021.
Moderator (Ericsson): "Email Discussion Summary for [95e][217] NR_pos_RRM_Part 3", 3GPP Draft; R4-2009029, 3GPP TSG-RAN WG4 Meeting # 95-e, 3rd Generation Partnership Project (3GPP), Mobile Competence Centre, 650, Route Des Lucioles, F-06921 Sophia-Antipolis Cedex, France, vol. Ran WG4. No. Electronic Meeting, May 25, 2020-Jun 5, 2020, Jun. 10, 2020 (Jun. 10, 2020), XP051896681, 52 Pages, issue 1-2-1, p. 22, issue 1-3-1 to 1-3-3, p. 20, issue 1-1-5, p. 13.

* cited by examiner

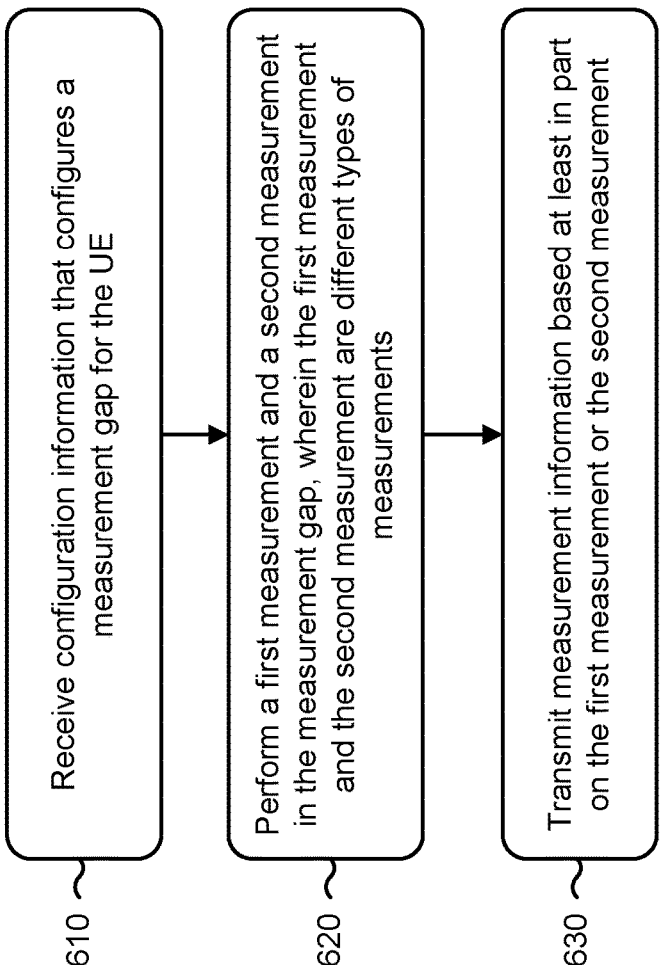

610 Receive configuration information that configures a measurement gap for the UE 620 Perform a first measurement and a second measurement in the measurement gap, wherein the first measurement and the second measurement are different types of measurements 630 Transmit measurement information based at least in part on the first measurement or the second measurement

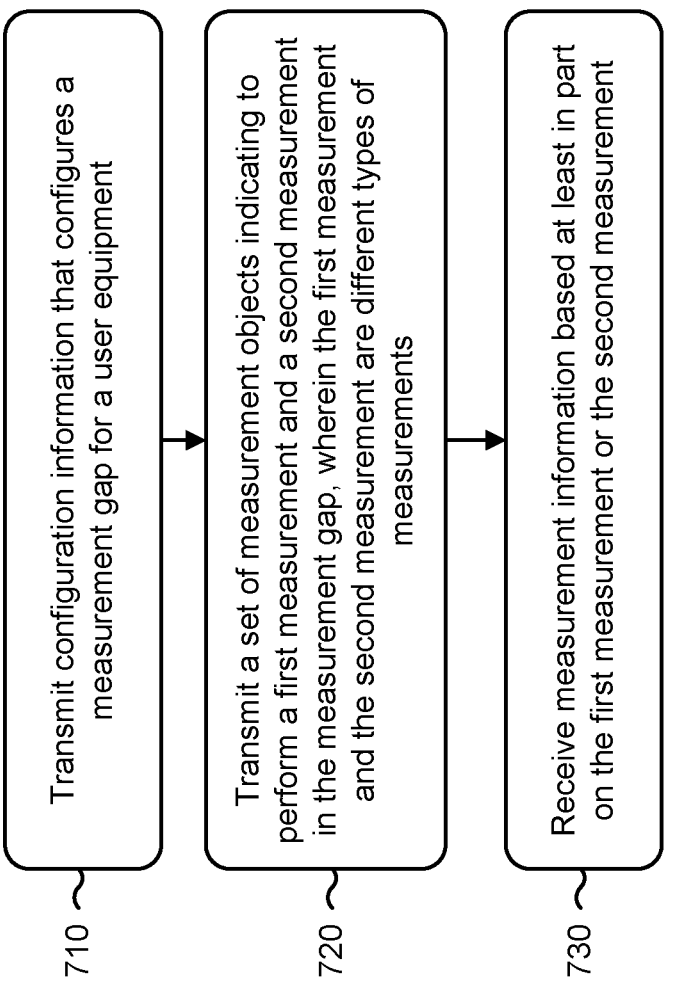

710 Transmit configuration information that configures a measurement gap for a user equipment 720 Transmit a set of measurement objects indicating to perform a first measurement and a second measurement in the measurement gap, wherein the first measurement and the second measurement are different types of measurements 730 Receive measurement information based at least in part on the first measurement or the second measurement

SHARING MEASUREMENT GAPS FOR MULTIPLE FUNCTIONS

CROSS-REFERENCE TO RELATED APPLICATION APPLICATIONS

This Patent Application is a 371 national stage of PCT Application PCT/US2021/070925, filed on Jul. 22, 2021, entitled "SHARING MEASUREMENT GAPS FOR MULTIPLE FUNCTIONS," which claims priority to Greece Patent Application Serial No. 20200100433, filed on Jul. 23, 2020, entitled "SHARING MEASUREMENT GAPS FOR MULTIPLE FUNCTIONS," which are hereby expressly incorporated by reference herein.

FIELD OF THE DISCLOSURE

Aspects of the present disclosure generally relate to wireless communication and to techniques and apparatuses for sharing measurement gaps for multiple functions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving configuration information that configures a measurement gap for the UE; performing a first measurement and a second measurement in the measurement gap, wherein the first measurement and the second measurement are different types of measurements; and transmitting measurement information based at least in part on the first measurement or the second measurement.

In some aspects, a method of wireless communication performed by a base station includes: transmitting configuration information that configures a measurement gap for a UE; transmitting a set of measurement objects indicating to perform a first measurement and a second measurement in the measurement gap, wherein the first measurement and the second measurement are different types of measurements; and receiving measurement information based at least in part on the first measurement or the second measurement.

In some aspects, a UE for wireless communication includes: a memory; and one or more processors coupled to the memory, the one or more processors configured to: receive configuration information that configures a measurement gap for the UE; perform a first measurement and a second measurement in the measurement gap, wherein the first measurement and the second measurement are different types of measurements; and transmit measurement information based at least in part on the first measurement or the second measurement.

In some aspects, a base station for wireless communication includes: a memory; and one or more processors coupled to the memory, the one or more processors configured to: transmit configuration information that configures a measurement gap for a UE; transmit a set of measurement objects indicating to perform a first measurement and a second measurement in the measurement gap, wherein the first measurement and the second measurement are different types of measurements; and receive measurement information based at least in part on the first measurement or the second measurement.

In some aspects, a non-transitory computer-readable medium storing one or more instructions for wireless communication includes: one or more instructions that, when executed by one or more processors of a UE, cause the one or more processors to: receive configuration information that configures a measurement gap for the UE; perform a first measurement and a second measurement in the measurement gap, wherein the first measurement and the second measurement are different types of measurements; and transmit measurement information based at least in part on the first measurement or the second measurement.

In some aspects, a non-transitory computer-readable medium storing one or more instructions for wireless communication includes: one or more instructions that, when executed by one or more processors of a base station, cause the one or more processors to: transmit configuration information that configures a measurement gap for a UE; transmit a set of measurement objects indicating to perform a first measurement and a second measurement in the measurement gap, wherein the first measurement and the second measurement are different types of measurements; and receive measurement information based at least in part on the first measurement or the second measurement.

In some aspects, an apparatus for wireless communication includes: means for receiving configuration information that configures a measurement gap for the apparatus; means for performing a first measurement and a second measurement in the measurement gap, wherein the first measurement and the second measurement are different types of measurements; and means for transmitting measurement information based at least in part on the first measurement or the second measurement.

In some aspects, an apparatus for wireless communication includes: means for transmitting configuration information that configures a measurement gap for a UE; means for transmitting a set of measurement objects indicating to perform a first measurement and a second measurement in the measurement gap, wherein the first measurement and the second measurement are different types of measurements; and means for receiving measurement information based at least in part on the first measurement or the second measurement.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-7 are diagrams illustrating example processes associated with sharing measurement gaps for multiple measurements, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
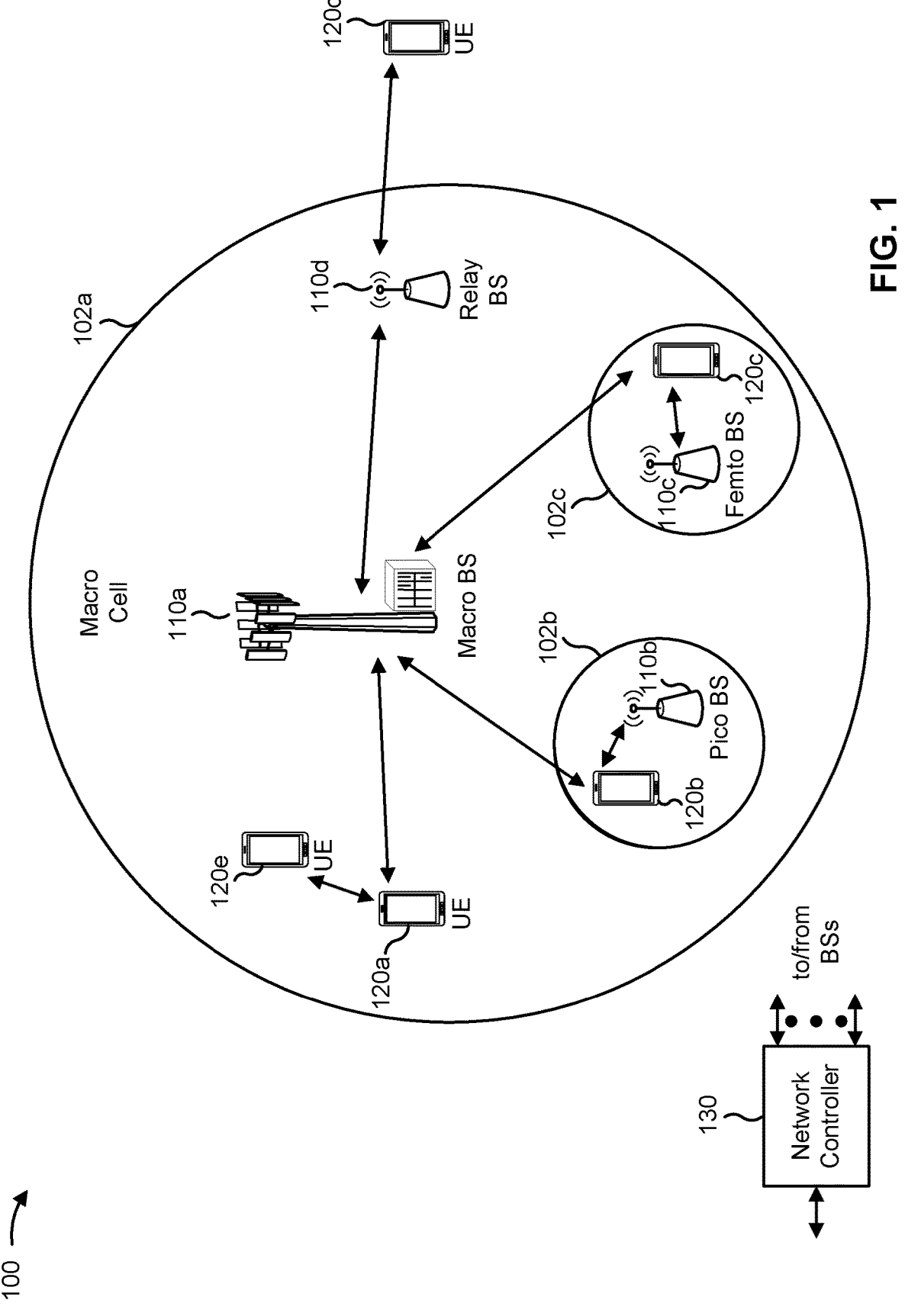
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
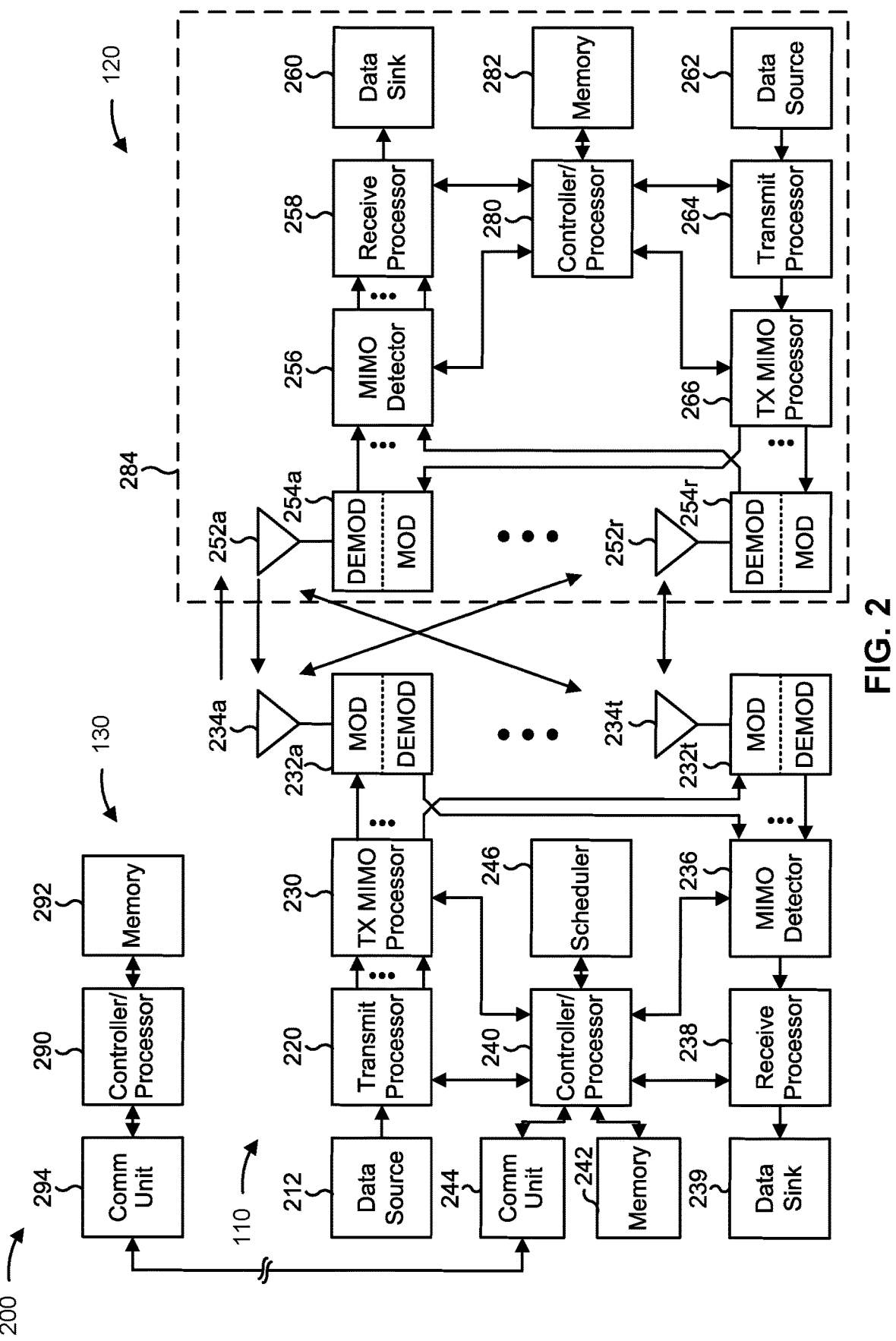
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream.

Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for discrete Fourier transform spread OFDM (DFT-s-OFDM) or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with sharing a measurement gap for multiple measurements, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving configuration information that configures a measurement gap for the UE; means for performing a first measurement and a second measurement in the measurement gap, wherein the first measurement and the second measurement are different types of measurements; means for transmitting measurement information based at least in part on the first measurement or the second measurement; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting configuration information that configures a measurement gap for a UE; means for transmitting a set of measurement objects indicating to perform a first measurement and a second measurement in the measurement gap, wherein the first measurement and the second measurement are different types of measurements; means for receiving measurement information based at least in part on the first measurement or the second measurement; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
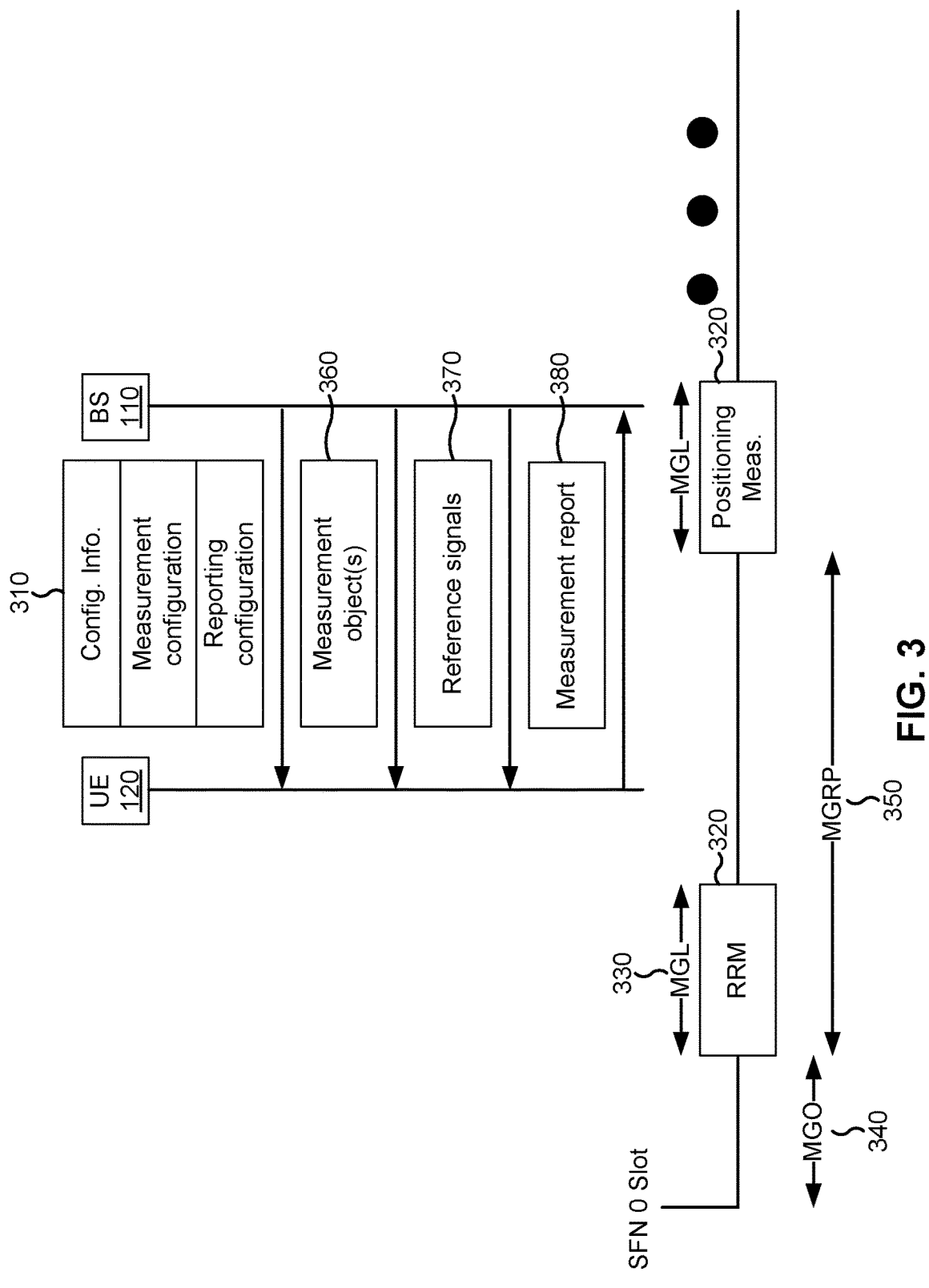
FIG. 3 is a diagram illustrating an example of configuration and performance of measurements in a set of measurement gaps, in accordance with the present disclosure.

FIG. 3 is a diagram illustrating an example 300 of configuration and performance of measurements in a set of measurement gaps, in accordance with the present disclosure. As shown, example 300 includes a UE and a BS. The UE may perform various measurements in the course of operation, such as radio resource management (RRM) measurements (e.g., inter-cell RRM measurements or intra-cell RRM measurements), positioning measurements (e.g., based at least in part on a positioning reference signal (PRS)), and/or the like. Example 300 describes how the UE 120 may be configured with a measurement configuration and measurement objects indicating measurements to perform in accordance with the measurement configuration.

As shown by reference number 310, the BS may provide configuration information (shown as Config. Info.) to the UE. For example, the BS may provide the configuration information via radio resource control (RRC) signaling, medium access control (MAC) signaling (e.g., a MAC control element (MAC-CE)), and/or the like. As further shown, the configuration information may identify a measurement configuration. For example, the measurement configuration may identify a measurement gap pattern for measurements by the UE. In some aspects, the BS may provide the measurement configuration in an RRC parameter, such as a measConfig parameter and/or the like. The measurement configuration may configure one or more measurement gaps 320 (sometimes abbreviated MG). The UE may perform a measurement in a measurement gap, such as an RRM measurement, a positioning measurement, and/or the like. A UE may not be expected to receive or transmit communications other than reference signals in a measurement gap. In some aspects, a measurement gap may be associated with a retuning gap at the beginning and/or end of the measurement gap, so that the UE can tune to and/or from an appropriate frequency and/or bandwidth for a measurement.

A measurement gap 320 may be associated with a measurement gap length (MGL), shown by reference number 330. In some aspects, the MGL may be based at least in part on a frequency range associated with the measurement. In other aspects, the MGL may be independent of the frequency range. The MGL may have a configurable length of, for example, 1.5 ms, 3 ms, 3.5 ms, 4 ms, 5.5 ms, or 6 ms. In some aspects, an MGL may be configured to be longer than 6 ms. For example, MGLs may be configured in the range of 10 ms to 40 ms, or even longer.

The measurement gaps 320 may be offset from a reference point by a measurement gap offset (MGO), shown by reference number 340. Here, the reference point is a slot associated with system frame number (SFN) 0. The MGO may be indicated in the configuration information shown by reference number 310. As shown by reference number 350, the measurement gaps 320 may repeat in accordance with a measurement gap repetition period (MGRP). The MGRP may be in a range of 20 ms to 160 ms, though other values may be used. For example, if a measurement gap is associated with an MGL longer than 20 ms, then the corresponding MGRP may be configured to be longer than 160 ms.

In some aspects, the time division multiplexing (TDM) pattern of the measurement configuration (e.g., the MGO, MGL, MGRP, and/or the like) may be based at least in part on a carrier-specific scaling factor (CSSF). A CSSF is a mechanism for monitoring multiple layers and/or measurement objects and for relaxing measurement performance requirements. For example, a CSSF may identify how measurement delays of various frequency layers are to be extended (e.g., based at least in part on a synchronization signal block (SSB) based radio resource management measurement timing configuration window (SMTC) window associated with the measurement configuration. An SMTC window may indicate, to the UE, when to expect an SSB from a BS 110.

As further shown, the configuration information may identify a reporting configuration. A reporting configuration may indicate how the UE is to report measurement information to the BS. For example, the reporting configuration may identify reporting conditions for the UE (e.g., event triggered reporting, periodic reporting, event-triggered period reporting, and/or the like).

As shown by reference number 360, the BS may transmit, to the UE, information indicating one or more measurement objects. A measurement object may identify parameters for performing a specific measurement, such as a carrier frequency to be monitored, a reference signal on which a measurement is to be performed, a frequency/time location of the reference signal, a subcarrier spacing (SCS) of the reference signal, a type of measurement to be performed, and/or the like. In some aspects, information indicating the one or more measurement objects may be provided as part of, or in association with, the configuration information shown by reference number 310. In some aspects, the information indicating the one or more measurement objects may be provided separately from the configuration information shown by reference number 310. In some aspects, a measurement object may be linked to a reporting configuration. For example, the UE may receive information indicating that a measurement object is associated with a reporting configuration, and may perform reporting of measurements associated with that measurement object in accordance with the associated reporting configuration. In some aspects, a set of measurement objects may indicate whether a set of measurements indicated by the set of objects is to be performed concurrently (e.g., in a same measurement gap).

As shown by reference number 370, the BS may transmit reference signals. A reference signal described herein may include, for example, a channel state information reference signal (CSI-RS), a PRS, an SSB, and/or the like. The UE may perform measurements on the reference signals in accordance with the measurement configuration and the measurement objects associated with the reference signals. As shown by reference number 380, the UE may transmit a measurement report based at least in part on measuring the reference signals. For example, if a reporting condition indicated by a reporting configuration is satisfied for a reference signal, the UE may transmit a measurement report as indicated by the reporting condition.

In some deployments, a UE can only be configured with a single measurement object per measurement gap. Thus, such a UE can perform only one type of measurement in a given measurement gap occasion. For example, the UE may be permitted to perform an RRM measurement on a first frequency in a first measurement gap, an RRM measurement on a second frequency in a second measurement gap, a positioning measurement in a third measurement gap, and so on. This distribution of measurements across measurement gaps may introduce significant delay and may bottleneck the measurements that can be performed by the UE, which may be particularly problematic as the complexity of the UE's measurement schedule increases and in scenarios where longer measurement gaps (e.g., 10 ms and upward) are configured.

Techniques and apparatuses described herein enable a UE to perform multiple measurements in a single measurement gap. For example, a UE can be configured with multiple measurement objects indicating measurements to be performed in a single measurement gap. The measurements can be associated with different frequencies and/or different bandwidths. If the measurements to be performed in a single measurement gap are associated with different frequencies and/or bandwidths, the UE 120 may insert a retuning gap between the measurements to be performed, as described elsewhere herein. Thus, the efficiency of measurements by the UE is increased, which reduces delay associated with such measurements and UE and BS resource consumption associated with facilitating measurements over a longer time window associated with single-measurement measurement gaps.

As indicated above, FIG. 3 is provided as an example. Other examples may differ from what is described with regard to FIG. 3.

Figure 4:
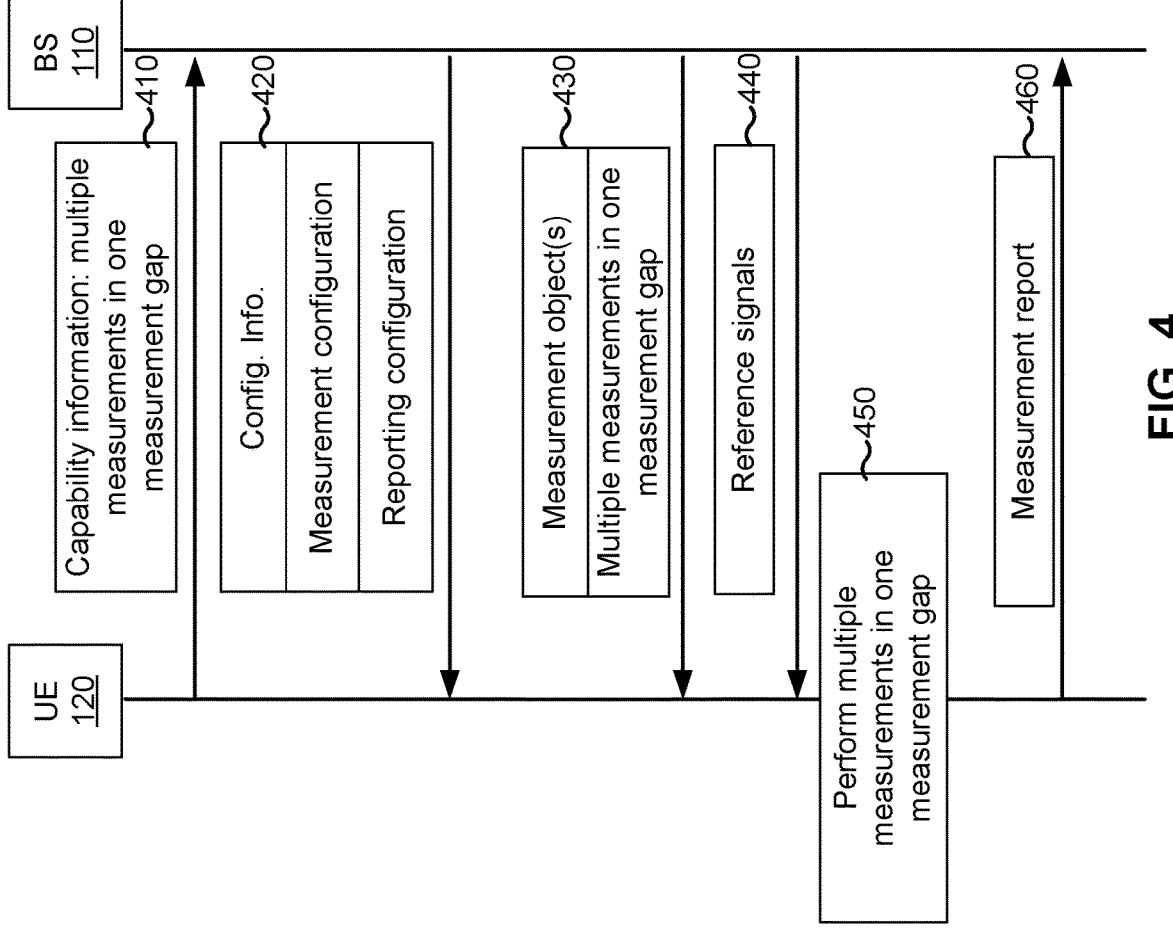
FIG. 4 is a diagram illustrating an example of configuration and measurement with multiple measurements in a measurement gap, in accordance with the present disclosure.
Figure 4:

FIG. 4 is a diagram illustrating an example 400 of configuration and measurement with multiple measurements in a measurement gap, in accordance with the present disclosure. As shown, example 400 includes a UE 120 and a BS 110.

As shown by reference number 410, the UE 120 may transmit, to the BS 110, capability information. For example, the UE 120 may transmit the capability information as UE capability information and/or the like. As further shown, the capability information may indicate whether the UE 120 is capable of performing multiple measurements in a measurement gap. For example, the capability information may indicate a number of measurements that the UE 120 can perform in a measurement gap. As another example, the capability information may indicate a number of measurements that the UE 120 can perform in a measurement gap of a given length. As yet another example, the capability information may indicate a number of measurements of different types that the UE 120 can perform in a measurement gap (e.g., one RRM measurement and one positioning measurement, two RRM measurements associated with different frequencies and/or bandwidths, and/or the like). As still another example, the capability information may indicate whether to provide a retuning gap between two measurements or reference signals (e.g., the capability information may indicate whether the UE would require additional retuning time between two different signals). In some aspects, the capability information may be specific to a band. For example, the capability information may indicate whether the UE 120 is capable of multiple measurements in a measurement gap on a given band. In some aspects, the capability information may be specific to a band combination. For example, the capability information may indicate whether the UE 120 is capable of performing a first measurement on a first band and a second measurement on a second band for one or more combinations of first bands and second bands.

A type of measurement may include, for example, synchronization signal (SS) reference signal received power (SS-RSRP), channel state information (CSI) RSRP (CSI-RSRP), SS reference signal received quality (SS-RSRQ), CSI-RSRQ, SS signal to interference plus noise ratio (SINR) (SS-SINR), CSI-SINR, UE global navigation satellite system (GNSS) timing of cell frames for UE positioning for Evolved Universal Mobile Telecommunications System (UMTS) Terrestrial Radio Access (E-UTRA), UE GNSS code measurement, UE GNSS carrier phase measurement, a wireless local area network (WLAN) RSSI, a reference signal time difference (RSTD) for E-UTRA, anSFN) and frame timing difference (SFTD), an E-UTRA RSRP, an E-UTRA RSRQ, an E-UTRA reference signal (RS) SINR (RS-SINR), an SS RSRP per branch (SS-SRSPB), a sounding RS (SRS) RSRP (SRS-RSRP), a cross link interference (CLI) RSSI (CLI-RSSI), an RSSI, a physical sidelink broadcast channel (PSBCH) RSRP, a physical sidelink shared channel (PSSCH) RSRP, a physical sidelink control channel (PSCCH) RSRP, a sidelink RSSI, a sidelink channel busy ratio (CBR), a sidelink channel occupancy ratio (CR), a downlink positioning reference signal (PRS) RSRP, a downlink RSTD, an uplink receive-transmit time difference, an SS RS antenna relative phase, a UTRA frequency division duplexing (FDD) common pilot channel (CPICH) received signal code power (RSCP), UMTS Terrestrial Radio Access (UTRA) FDD carrier RSSI, UTRA FDD CPICH received energy over noise density (Ec/No), an SSS transmit power, an uplink relative time of arrival, a base station receive-transmit time difference, an uplink angle of arrival, an uplink SRS RSRP, or the like. "RRM measurement" may include one or more of the above types of measurement.

As shown by reference number 420, the BS 110 may provide configuration information to the UE 120. The configuration information is described in more detail in connection with reference number 310 of FIG. 3. In some aspects, the configuration information may be based at least in part on the capability information. For example, the BS 110 may determine the configuration information (e.g., an MGL, an MGRP, and/or the like) based at least in part on the capability information. More particularly, if a retuning gap is to be provided between a first measurement and a second measurement in a measurement gap, the BS 110 may determine the retuning gap based at least in part on the capability information. For example, the BS 110 may determine the retuning gap based at least in part on whether the capability information indicates that the UE 120 requests a retuning gap, based at least in part on a requested length of a retuning gap, based at least in part on a capability associated with a band or a band combination associated with the first measurement and the second measurement, and/or the like.

In some aspects, the UE 120 and/or the BS 110 may determine a maximum number of measurements performed in a measurement gap. For example, the maximum number of measurements may be based at least in part on (e.g., a function of) a duration of the measurement gap. In some aspects, the BS 110 may determine the maximum number of measurements (e.g., based at least in part on the capability information, traffic conditions at the BS 110, and/or the like), and may signal information indicating the maximum number of measurements to the UE 120. In some aspects, the BS 110 may determine the maximum number of measurements based at least in part on a duration of an SMTC of the UE 120, based at least in part on an expected duration of a CSI-RS or PRS associated with the measurement gap, and/or the like. For example, if the SMTC is longer, then the maximum number of measurements may be decreased, and/or vice-versa.

In some aspects, the UE 120 may store information indicating the maximum number of measurements. For example, the maximum number of measurements may be preconfigured (e.g., based at least in part on a wireless communication specification, by a manufacturer or servicer of the UE 120, and/or the like). As examples, the maximum number of measurements may be 2 measurements in a measurement gap with an MGL of 6 ms or 3 measurements in a measurement gap with an MGL of 10 ms.

In some aspects, the BS 110 or the UE 120 may adjust a CSSF based at least in part on the capability information. For example, the UE 120 and/or the BS 110 may determine a modified CSSF based at least in part on whether the UE 120 can perform multiple measurements within a measurement gap. More particularly, the UE 120 and/or the BS 110 may reduce a delay associated with the CSSF if the UE 120 can perform multiple measurements within a measurement gap. Thus, the UE 120 and/or the BS 110 may reduce latency associated with measurement operations of the UE 120, thereby conserving processing and communication resources of the UE 120 and the BS 110.

As shown by reference number 430, the BS 110 may provide a set of measurement objects to the UE 120. As further shown, the set of measurement objects may indicate to perform multiple measurements in a measurement gap. In some aspects, the set of measurement objects may explicitly indicate to perform multiple measurements in the measurement gap. For example, the set of measurement objects may map multiple measurements to time/frequency resources associated with reference signals transmitted in the measurement gap. In some aspects, the UE 120 may determine that the multiple measurements are to be performed in the measurement gap. For example, the UE 120 may assign the measurement objects to reference signals in the measurement gap (e.g., based at least in part on a configuration of the UE 120).

As shown by reference number 440, the BS 110 may transmit reference signals to the UE 120. For example, the BS 110 may transmit the reference signals in a configured measurement gap of the UE 120. As shown by reference number 450, the UE 120 may perform multiple measurements in a measurement gap. For example, the UE 120 may perform the multiple measurements based at least in part on the set of measurement objects shown by reference number 430. In some aspects, the UE 120 may perform the multiple measurements based at least in part on a retuning gap between the multiple measurements, as described elsewhere herein. In some aspects, the multiple measurements may include two or more types of measurements. As shown by reference number 460, the UE 120 may transmit a measurement report based at least in part on the multiple measurements. The measurement report may include measurement information determined based at least in part on the first measurement and/or the second measurement. As further shown, the BS 110 may receive the measurement report. The transmission of the measurement report is described in more detail in connection with FIG. 3. In some aspects, the UE 120 may perform another action based at least in part on the multiple measurements, such as an RRM-related action, synchronization, and/or the like.

In this way, the UE 120 may perform multiple measurements in a measurement gap (e.g., in accordance with multiple measurement objects associated with the measurement gap). By performing the multiple measurements in the measurement gap, the UE 120 conserves processing and communication resources that would otherwise be used to perform the multiple measurements in multiple measurement gaps.

As indicated above, FIG. 4 is provided as an example. Other examples may differ from what is described with regard to FIG. 4.

Figure 5:
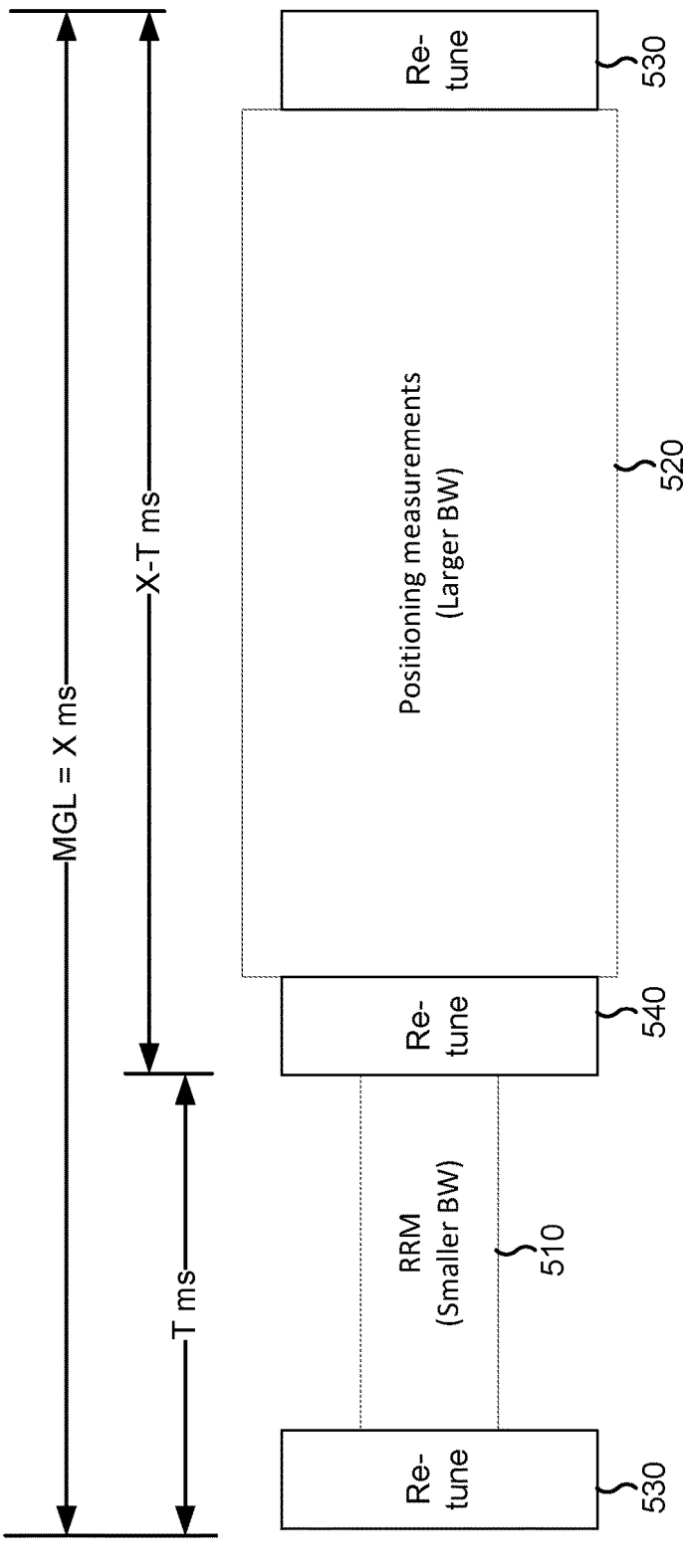
FIG. 5 is a diagram illustrating an example of multiple measurements within a measurement gap, in accordance with the present disclosure.

FIG. 5 is a diagram illustrating an example of multiple measurements within a measurement gap 500, in accordance with the present disclosure. The measurement gap 500 is an illustration of a measurement gap (e.g., measurement gap 320) in which a UE (e.g., UE 120) performs multiple measurements in accordance with the present disclosure. As shown, the measurement gap 500 is associated with an MGL of X ms, where X includes any value for a length of an MGL described elsewhere herein. As shown, the measurement gap 500 includes a first measurement shown by reference number 510 (here, an RRM measurement on a smaller bandwidth) and a second measurement shown by reference number 520 (here, a positioning measurement on a larger bandwidth than the RRM measurement). The UE 120 may be configured to perform the first measurement and the second measurement based at least in part on respective measurement objects, as described in more detail elsewhere herein. In some aspects, the first measurement and the second measurement may be different types of measurements. In some aspects, the first measurement and the second measurement may be a same type of measurement.

As further shown, the measurement gap 500 includes retuning gaps 530 and 540. Retuning gaps 530 may be for the UE to tune from a communication frequency and bandwidth to a frequency and bandwidth associated with the first measurement, and from a frequency and bandwidth associated with the second measurement to the communication frequency and bandwidth, respectively. Retuning gap 540 may provide time for the UE to tune from a frequency and bandwidth associated with the first measurement to a frequency and bandwidth associated with the second measurement, as described elsewhere herein. If the first measurement and the second measurement have the same frequency and bandwidth, or if the UE is capable of performing the first measurement and the second measurement without a retuning gap (e.g., based at least in part on a capability of the UE 120 indicated by the capability information), then the measurement gap 500 may not include the retuning gap 540. In some aspects, the retuning gap 540 may be based at least in part on a time offset from a start of the MGL, such as a time offset of T ms, as shown.

While two measurements are illustrated in the measurement gap 500, in some aspects, the measurement gap 500 may include a different number of measurements. For example, the UE 120 may be configured to perform Y measurements in a gap, where Y is an integer.

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., UE 120) performs operations associated with sharing measurement gaps for multiple functions.

As shown in FIG. 6, in some aspects, process 600 may include receiving configuration information that configures a measurement gap for the UE (block 610). For example, the UE (e.g., using antenna 252, demodulator 254, MIMO detector 256, receive processor 258, controller/processor 280, and/or memory 282) may receive configuration information that configures a measurement gap for the UE, as described above.

As further shown in FIG. 6, in some aspects, process 600 may include performing a first measurement and a second measurement in the measurement gap, wherein the first measurement and the second measurement are different types of measurements (block 620). For example, the UE (e.g., using antenna 252, demodulator 254, MIMO detector 256, receive processor 258, transmit processor 264, TX MIMO processor 266, modulator 254, controller/processor 280, and/or memory 282) may perform a first measurement and a second measurement in the measurement gap, wherein the first measurement and the second measurement are different types of measurements, as described above.

As further shown in FIG. 6, in some aspects, process 600 may include transmitting measurement information based at least in part on the first measurement or the second measurement (block 630). For example, the UE (e.g., using antenna 252, transmit processor 264, TX MIMO processor 266, modulator 254, controller/processor 280, and/or memory 282) may transmit measurement information based at least in part on the first measurement or the second measurement, as described above.

Process 600 may include additional aspects, such as any single aspect or any combination of aspects described below and/or in connection with one or more other processes described elsewhere herein.

In a first aspect, a time gap is provided between the first measurement and the second measurement based at least in part on the first measurement and the second measurement being associated with different bandwidths or different frequencies.

In a second aspect, alone or in combination with the first aspect, process 600 includes performing a retuning operation in the time gap.

In a third aspect, alone or in combination with one or more of the first and second aspects, process 600 includes transmitting capability information indicating that the UE supports performing multiple measurements of different types in a single measurement gap.

In a fourth aspect, alone or in combination with one or more of the first through third aspects, the capability information indicates whether to configure a time gap between the first measurement and the second measurement.

In a fifth aspect, alone or in combination with one or more of the first through fourth aspects, process 600 includes receiving a set of measurement objects configuring the first measurement and the second measurement, wherein the set of measurement objects indicates whether the first measurement and the second measurement are to be performed concurrently.

In a sixth aspect, alone or in combination with one or more of the first through fifth aspects, the configuration information indicates a maximum number of measurements that can be performed in the measurement gap.

In a seventh aspect, alone or in combination with one or more of the first through sixth aspects, the maximum number of measurements is based at least in part on a length of the measurement gap.

In an eighth aspect, alone or in combination with one or more of the first through seventh aspects, the maximum number of measurements is based at least in part on at least one of a duration of a synchronization signal block based radio resource management measurement timing configuration window, a duration associated with a channel state information reference signal used to perform the first measurement or the second measurement, or a duration associated with a positioning reference signal used to perform the first measurement or the second measurement.

In a ninth aspect, alone or in combination with one or more of the first through eighth aspects, performing the first measurement and the second measurement is based at least in part on a maximum number of measurements that can be performed in the measurement gap, wherein the maximum number of measurements is based at least in part on a length of the measurement gap.

In a tenth aspect, alone or in combination with one or more of the first through ninth aspects, the maximum number of measurements is identified by stored information of the UE.

In an eleventh aspect, alone or in combination with one or more of the first through tenth aspects, performing the first measurement and the second measurement is based at least in part on a carrier-specific scaling factor that is adjusted based at least in part on the UE being capable of performing multiple measurements within a measurement gap.

In a twelfth aspect, alone or in combination with one or more of the first through eleventh aspects, the first measurement is a radio resource management measurement and the second measurement is a positioning measurement.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a base station, in accordance with the present disclosure. Example process 700 is an example where the base station (e.g., base station 110) performs operations associated with sharing measurement gaps for multiple functions.

As shown in FIG. 7, in some aspects, process 700 may include transmitting configuration information that configures a measurement gap for a UE (block 710). For example, the base station (e.g., using transmit processor 220, TX MIMO processor 230, modulator 232, antenna 234, controller/processor 240, memory 242, and/or scheduler 246) may transmit configuration information that configures a measurement gap for a UE, as described above.

As further shown in FIG. 7, in some aspects, process 700 may include transmitting a set of measurement objects indicating to perform a first measurement and a second measurement in the measurement gap, wherein the first measurement and the second measurement are different types of measurements (block 720). For example, the base station (e.g., using transmit processor 220, TX MIMO processor 230, modulator 232, antenna 234, controller/ processor 240, memory 242, and/or scheduler 246) may transmit a set of measurement objects indicating to perform a first measurement and a second measurement in the measurement gap, wherein the first measurement and the second measurement are different types of measurements, as described above.

As further shown in FIG. 7, in some aspects, process 700 may include receiving measurement information based at least in part on the first measurement or the second measurement (block 730). For example, the base station (e.g., using antenna 234, demodulator 232, MIMO detector 236, receive processor 238, controller/processor 240, and/or memory 242) may receive measurement information based at least in part on the first measurement or the second measurement, as described above.

Process 700 may include additional aspects, such as any single aspect or any combination of aspects described below and/or in connection with one or more other processes described elsewhere herein.

In a first aspect, a time gap is provided between the first measurement and the second measurement based at least in part on the first measurement and the second measurement being associated with different bandwidths or different frequencies.

In a second aspect, alone or in combination with the first aspect, process 700 includes receiving capability information indicating that the UE supports performing multiple measurements of different types in a single measurement gap, wherein the configuration information is based at least in part on the capability information.

In a third aspect, alone or in combination with one or more of the first and second aspects, the capability information indicates whether to configure a time gap between the first measurement and the second measurement.

In a fourth aspect, alone or in combination with one or more of the first through third aspects, the set of measurement objects indicates whether the first measurement and the second measurement are to be performed concurrently based at least in part on the capability information.

In a fifth aspect, alone or in combination with one or more of the first through fourth aspects, the configuration information indicates a maximum number of measurements that can be performed in the measurement gap.

In a sixth aspect, alone or in combination with one or more of the first through fifth aspects, the maximum number of measurements is based at least in part on a length of the measurement gap.

In a seventh aspect, alone or in combination with one or more of the first through sixth aspects, the maximum number of measurements is based at least in part on at least one of a duration of a synchronization signal block based radio resource management measurement timing configuration window, a duration associated with a channel state information reference signal used to perform the first measurement or the second measurement, or a duration associated with a positioning reference signal used to perform the first measurement or the second measurement.

In an eighth aspect, alone or in combination with one or more of the first through seventh aspects, the set of measurement objects is based at least in part on a carrier-specific scaling factor that is adjusted based at least in part on the UE being capable of performing multiple measurements within the measurement gap.

In a ninth aspect, alone or in combination with one or more of the first through eighth aspects, the first measurement is a radio resource management measurement and the second measurement is a positioning measurement.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: receiving configuration information that configures a measurement gap for the UE; performing a first measurement and a second measurement in the measurement gap, wherein the first measurement and the second measurement are different types of measurements; and transmitting measurement information based at least in part on the first measurement or the second measurement.

Aspect 2: The method of one or more of the previous Aspects, wherein a time gap is provided between the first measurement and the second measurement based at least in part on the first measurement and the second measurement being associated with different bandwidths or different frequencies.

Aspect 3: The method of Aspect 2, further comprising: performing a retuning operation in the time gap.

Aspect 4: The method of one or more of the previous Aspects, further comprising: transmitting capability information indicating that the UE supports performing multiple measurements of different types in a single measurement gap.

Aspect 5: The method of Aspect 4, wherein the capability information indicates whether to configure a time gap between the first measurement and the second measurement.

Aspect 6: The method of one or more of the previous Aspects, further comprising: receiving a set of measurement objects configuring the first measurement and the second measurement, wherein the set of measurement objects indicates whether the first measurement and the second measurement are to be performed concurrently.

Aspect 7: The method of one or more of the previous Aspects, wherein the configuration information indicates a maximum number of measurements that can be performed in the measurement gap.

Aspect 8: The method of Aspect 7, wherein the maximum number of measurements is based at least in part on a length of the measurement gap.

Aspect 9: The method of Aspect 7, wherein the maximum number of measurements is based at least in part on at least one of: a duration of a synchronization signal block-based radio resource management measurement timing configuration window, a duration associated with a channel state information reference signal used to perform the first measurement or the second measurement, or a duration associated with a positioning reference signal used to perform the first measurement or the second measurement.

Aspect 10: The method of one or more of the previous Aspects, wherein performing the first measurement and the second measurement is based at least in part on a maximum number of measurements that can be performed in the measurement gap, wherein the maximum number of measurements is based at least in part on a length of the measurement gap.

Aspect 11: The method of Aspect 10, wherein the maximum number of measurements is identified by stored information of the UE.

Aspect 12: The method of one or more of the previous Aspects, wherein performing the first measurement and the second measurement is based at least in part on a carrier-specific scaling factor that is adjusted based at least in part on the UE being capable of performing multiple measurements within a measurement gap.

Aspect 13: The method of one or more of the previous Aspects, wherein the first measurement is a radio resource management measurement and the second measurement is a positioning measurement.

Aspect 14: A method of wireless communication performed by a base station, comprising: transmitting configuration information that configures a measurement gap for a UE; transmitting a set of measurement objects indicating to perform a first measurement and a second measurement in the measurement gap, wherein the first measurement and the second measurement are different types of measurements; and receiving measurement information based at least in part on the first measurement or the second measurement.

Aspect 15: The method of Aspect 14, wherein a time gap is provided between the first measurement and the second measurement based at least in part on the first measurement and the second measurement being associated with different bandwidths or different frequencies.

Aspect 16: The method of one or more of Aspects 14 or 15, further comprising: receiving capability information indicating that the UE supports performing multiple measurements of different types in a single measurement gap, wherein the configuration information is based at least in part on the capability information.

Aspect 17: The method of Aspect 16, wherein the capability information indicates whether to configure a time gap between the first measurement and the second measurement.

Aspect 18: The method of Aspect 16, wherein the set of measurement objects indicates whether the first measurement and the second measurement are to be performed concurrently based at least in part on the capability information.

Aspect 19: The method of one or more of Aspects 14 through 18, wherein the configuration information indicates a maximum number of measurements that can be performed in the measurement gap.

Aspect 20: The method of Aspect 19, wherein the maximum number of measurements is based at least in part on a length of the measurement gap.

Aspect 21: The method of Aspect 19, wherein the maximum number of measurements is based at least in part on at least one of: a duration of a synchronization signal block-based radio resource management measurement timing configuration window, a duration associated with a channel state information reference signal used to perform the first measurement or the second measurement, or a duration associated with a positioning reference signal used to perform the first measurement or the second measurement.

Aspect 22: The method of one or more of Aspects 14 through 21, wherein the set of measurement objects is based at least in part on a carrier-specific scaling factor that is adjusted based at least in part on the UE being capable of performing multiple measurements within the measurement gap.

Aspect 23: The method of one or more of Aspects 14 through 22, wherein the first measurement is a radio resource management measurement and the second measurement is a positioning measurement.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      transmit capability information indicating that the UE supports performing multiple measurements of different types in a single measurement gap, the different types including a first type and a second type different from the first type, the first type being a radio resource management (RRM) measurement, and the second type being a positioning measurement;
      receive configuration information that configures, for the UE, a measurement gap for multiple measurements of the different types in the single measurement gap;
      perform, in the measurement gap, a first measurement of the first type and a second measurement of the second type; and
      transmit measurement information based at least in part on the first measurement or the second measurement.

2. The apparatus of claim 1, wherein a time gap is provided between the first measurement and the second measurement based at least in part on the first measurement and the second measurement being associated with different bandwidths or different frequencies.

3. The apparatus of claim 2, wherein the one or more processors are further configured to:
   perform a retuning operation in the time gap.

4. The apparatus of claim 1, wherein the capability information indicates whether to configure a time gap between the first measurement and the second measurement.

5. The apparatus of claim 1, wherein the one or more processors are further configured to:
   receive a set of measurement objects configuring the first measurement and the second measurement, wherein the set of measurement objects indicates whether the first measurement and the second measurement are to be performed concurrently.

6. The apparatus of claim 1, wherein the configuration information indicates a maximum number of measurements that can be performed in the measurement gap.

7. The apparatus of claim 6, wherein the maximum number of measurements is based at least in part on a length of the measurement gap.

8. The apparatus of claim 6, wherein the maximum number of measurements is based at least in part on at least one of:

a duration of a synchronization signal block-based radio resource management measurement timing configuration window, a duration associated with a channel state information reference signal used to perform the first measurement or the second measurement, or a duration associated with a positioning reference signal used to perform the first measurement or the second measurement.

9. The apparatus of claim 1, wherein performing the first measurement and the second measurement is based at least in part on a maximum number of measurements that can be performed in the measurement gap, wherein the maximum number of measurements is based at least in part on a length of the measurement gap.

10. The apparatus of claim 9, wherein the maximum number of measurements is identified by stored information of the UE.

11. The apparatus of claim 1, wherein performing the first measurement and the second measurement is based at least in part on a carrier-specific scaling factor that is adjusted based at least in part on the UE being capable of performing multiple measurements within the measurement gap.

12. The apparatus of claim 1, wherein the first measurement is a radio resource management measurement and the second measurement is a positioning measurement.

13. An apparatus for wireless communication at a base station, comprising:

a memory; and one or more processors, coupled to the memory, configured to:

receive capability information indicating that a user equipment (UE) supports performing multiple measurements of different types in a single measurement gap, the different types including a first type and a second type different from the first type, the first type being a radio resource management (RRM) measurement, and the second type being a positioning measurement;

transmit, based at least in part on the capability information, configuration information that configures, for the UE, a measurement gap for multiple measurements of the different types in the single measurement gap;

transmit a set of measurement objects indicating to perform, in the measurement gap, a first measurement of the first type and a second measurement of the second type; and receive measurement information based at least in part on the first measurement or the second measurement.

14. The apparatus of claim 13, wherein a time gap is provided between the first measurement and the second measurement based at least in part on the first measurement and the second measurement being associated with different bandwidths or different frequencies.

15. The apparatus of claim 13, wherein the capability information indicates whether to configure a time gap between the first measurement and the second measurement.

16. The apparatus of claim 13, wherein the set of measurement objects indicates whether the first measurement and the second measurement are to be performed concurrently based at least in part on the capability information.

17. The apparatus of claim 13, wherein the configuration information indicates a maximum number of measurements that can be performed in the measurement gap.

18. The apparatus of claim 17, wherein the maximum number of measurements is based at least in part on a length of the measurement gap.

19. The apparatus of claim 17, wherein the maximum number of measurements is based at least in part on at least one of:

a duration of a synchronization signal block-based radio resource management measurement timing configuration window, a duration associated with a channel state information reference signal used to perform the first measurement or the second measurement, or a duration associated with a positioning reference signal used to perform the first measurement or the second measurement.

20. The apparatus of claim 13, wherein the set of measurement objects is based at least in part on a carrier-specific scaling factor that is adjusted based at least in part on the UE being capable of performing multiple measurements within the measurement gap.

21. The apparatus of claim 13, wherein the first measurement is a radio resource management measurement and the second measurement is a positioning measurement.

22. A method of wireless communication performed by an apparatus of a user equipment (UE), comprising:

transmitting capability information indicating that the UE supports performing multiple measurements of different types in a single measurement gap, the different types including a first type and a second type different from the first type, the first type being a radio resource management (RRM) measurement, and the second type being a positioning measurement;

receiving configuration information that configures, for the UE, a measurement gap for multiple measurements of the different types in the single measurement gap;

performing, in the measurement gap, a first measurement of the first type and a second measurement of the second type; and transmitting measurement information based at least in part on the first measurement or the second measurement.

23. The method of claim 22, wherein a time gap is provided between the first measurement and the second measurement based at least in part on the first measurement and the second measurement being associated with different bandwidths or different frequencies.

24. The method of claim 23, further comprising:

performing a retuning operation in the time gap.

25. A method of wireless communication performed by an apparatus of a base station, comprising:

receiving capability information indicating that a user equipment (UE) supports performing multiple measurements of different types in a single measurement gap, the different types including a first type and a second type different from the first type, the first type being a radio resource management (RRM) measurement, and the second type being a positioning measurement;

transmitting, based at least in part on the capability information, configuration information that configures, for the UE, a measurement gap for multiple measure-ments of the different types in the single measurement gap;

transmitting a set of measurement objects indicating to perform, in the measurement gap, a first measurement of the first type and a second measurement of the second type; and receiving measurement information based at least in part on the first measurement or the second measurement.

26. The method of claim 25, wherein a time gap is provided between the first measurement and the second measurement based at least in part on the first measurement and the second measurement being associated with different bandwidths or different frequencies.

27. The method of claim 25, wherein the capability information indicates whether to configure a time gap between the first measurement and the second measurement.

28. The method of claim 22, wherein the capability information indicates whether to configure a time gap between the first measurement and the second measurement.

29. The method of claim 22, further comprising:

receiving a set of measurement objects configuring the first measurement and the second measurement, wherein the set of measurement objects indicates whether the first measurement and the second measure-ment are to be performed concurrently.

30. The method of claim 22, wherein the configuration information indicates a maximum number of measurements that can be performed in the measurement gap.

* * * * *